United States Patent [19]

Baratz

[11] 4,291,682
[45] Sep. 29, 1981

[54] SOLAR COLLECTOR

[76] Inventor: Uriel Baratz, Katznelson 2, Tivon, Israel

[21] Appl. No.: 40,879

[22] Filed: May 21, 1979

[30] Foreign Application Priority Data

May 26, 1978 [DE] Fed. Rep. of Germany ....... 2822970

[51] Int. Cl.³ .............................................. F24J 3/02
[52] U.S. Cl. .................... 126/448; 126/445; 126/450
[58] Field of Search ............... 126/450, 432, 448, 445

[56] References Cited

U.S. PATENT DOCUMENTS

| | | | |
|---|---|---|---|
| 3,934,323 | 1/1976 | Ford et al. | 126/448 X |
| 3,965,887 | 6/1976 | Gramer et al. | 126/450 X |
| 4,048,981 | 9/1977 | Hobbs | 126/450 X |
| 4,055,163 | 10/1977 | Costello et al. | 126/450 X |
| 4,196,717 | 4/1980 | Ginsanino | 126/450 X |

FOREIGN PATENT DOCUMENTS

| | | | |
|---|---|---|---|
| 2535581 | 2/1976 | Fed. Rep. of Germany | 126/448 |
| 2641119 | 3/1978 | Fed. Rep. of Germany | 126/450 |

*Primary Examiner*—Allan N. Shoap
*Attorney, Agent, or Firm*—Owen, Wickersham & Erickson

[57] ABSTRACT

A solar-heat collector having a lightweight plastic frame enclosing a lightweight plastic heat exchanger and with feed and discharge manifolds connected to opposite ends of the heat exchanger. The manifolds are respectively connected to plastic feed and discharge pipes. A light-transmitting sheet covers the front of the heat exchanger, and there is heat exchange behind or beneath the heat exchanger.

4 Claims, 6 Drawing Figures

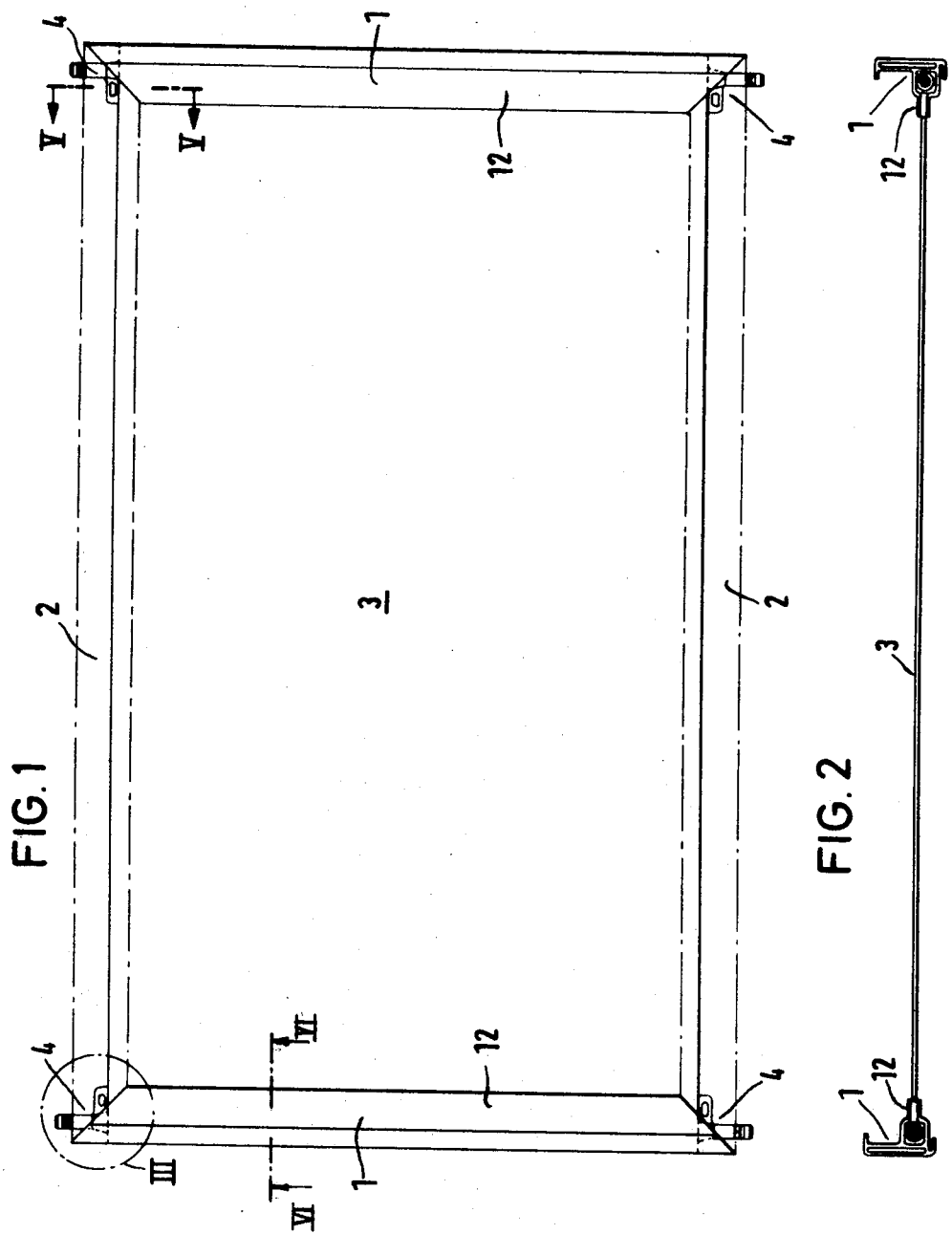

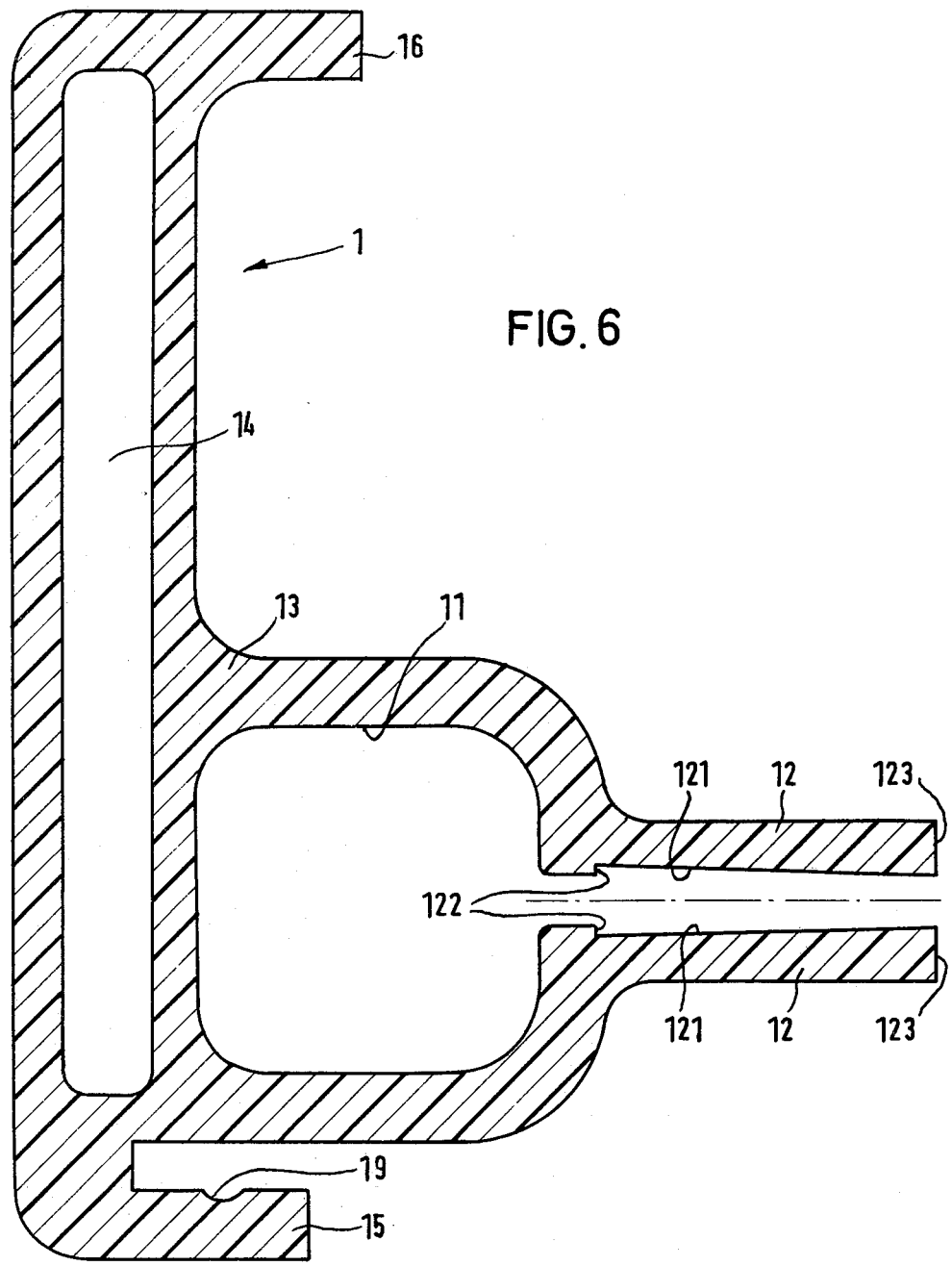

SOLAR COLLECTOR

The invention relates to an improved solar-heat collector.

The solar-heat collector of this invention is of the type having a frame, a blackened heat exchanger secured in the frame and through which a heat conducting medium, such as water, flows, a feed or intake manifold, and a discharge or outlet manifold for the heat-conduction medium in the heat exchanger, feed, and discharge pipe connections for the heat-conduction medium for each manifold, a light-transmitting covering in front of the heat exchanger, and heat insulation behind the heat exchanger.

Such a solar-heat collector in which the frame, the heat exchanger, the manifolds, and the pipe socket are made of metal, is known. This type of solar-heat collector has the disadvantage that, apart from the great number of structural components used, fabrication is rather cumbersome, and only solar-heat collectors of a few quite specific sizes can be delivered. Also, these solar-heat collectors are heavy, so that their being mounted, for example, on roofs is limited to where there is strong roof structure. Since, as mentioned, these prior-art solar-heat collectors are made preponderantly of metal—for example, the heat exchanger may comprise copper tubes applied onto a copper plate, or it may comprise passages for the heat-conduction medium which have been worked into aluminum—they are subject to very considerable heat expansion, for which reason they cannot be used, even when antifreeze agents are added, over extremely wide temperature ranges, particularly not at extraordinarily low outside temperatures, and for which reason they are often provided with auxiliary heating devices.

The object of the invention is to provide a solar-heat collector which is simple to manufacture and which can be operated also at extreme temperatures, particularly at extremely low temperatures. The object is achieved in accordance with the invention by making at least the frame and the heat exchanger of plastic.

Preferably, the heat exchanger comprises a double-walled, multi-bridged plastic structure which is extraordinarily elastic, for which reason the solar-heat collector in accordance with the invention can be used at extraordinarily great variations of the outside temperatures and also at extraordinarily low outside temperatures without requiring auxiliary heating devices. In addition, the frame which is made of plastic can be shaped so that it simultaneously forms the supply and the discharge means for the heat conduction medium, preferably water, for which reason the additional provision of separate manifolds is dispensed with.

Due to the fact that, in accordance with the invention, the frame and the heat exchanger are made of plastic, additional insulation or heat retention for the solar collector is not required, since due to the relatively low heat conductivity of the plastic, the construction is inherently heat retaining. This heat retention effect can be improved by providing an insulation chamber in the frame during the manufacture, preferably by extrusion, of the frame members, so that a substantially cohesive insulation chamber is created when the frame is assembled, surrounding the heat exchanger.

Finally, it is of advantage to have the pipe connections made of plastic, preferably molded, and inserted, preferably secured by adhesives, into the cavity forming the respective manifold in the medium-carrying member of the frame. By providing a suitably shaped lateral projection from the pipe connection it is possible not only to have the heat exchanger extend on the edge, but also non-medium-carrying members of the frame can in this manner be connected, by means of the projection on the pipe connection, with the medium-carrying members of the frame. Since the heat exchanger as well as the frame are made of plastic, both expansions caused by heat variations may occur quite uniformly, the single fixed connection between the frame members between themselves and between the frame and the heat exchanger being preferably established via this connection.

The connection between the heat exchanger, that is, its channels, and the medium-conducting members, that is, the cavity forming the manifold, is achieved by projections overlapping and preferably clamping the heat exchanger.

In view of the construction of the solar-heat collector in accordance with the invention, it is possible to create solar-heat collectors of practically any desired size, since the essential elements, namely, the heat exchanger and the frame or frame members, can be manufactured in any desired forms by severing finished, extruded strips.

The invention is described in great detail hereinbelow in connection with the embodiment illustrated in the drawings.

In the drawings:

FIG. 1 is a top view of a solar collector in accordance with the invention.

FIG. 2 is a side view of the essential parts of the solar collector in accordance with FIG. 1, but without the non-medium-carrying frame members.

FIG. 6 is a section VI—VI in accordance with FIG. 1.

Figure 3:
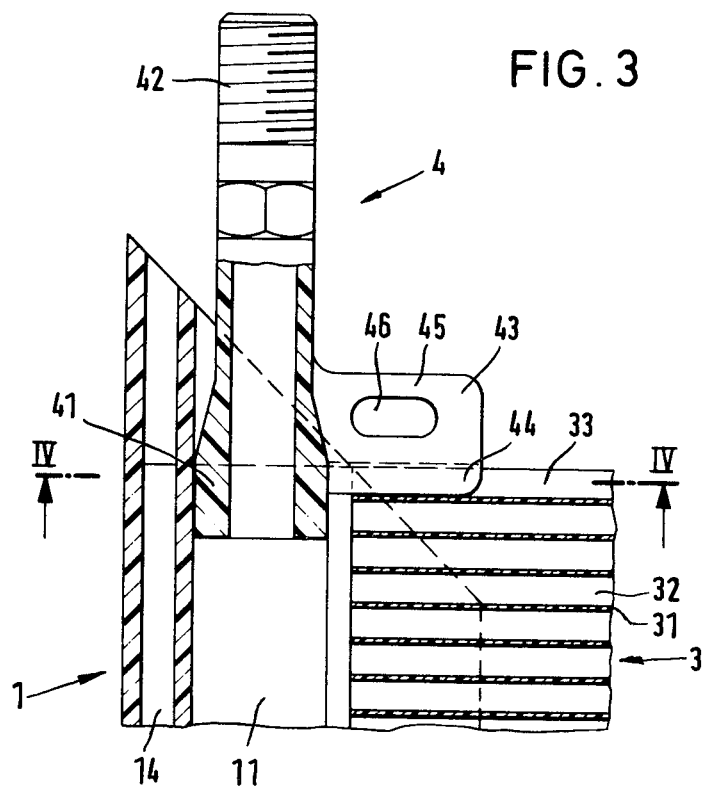
FIG. 3 is the detail III in section, in accordance with FIG. 1.

The solar collector shown in FIGS. 1 and 2 has substantially a frame with two medium-carrying—in particular water-carrying—frame members 1 disposed opposite each other, and two non-medium-carrying frame members 2 disposed substantially vertically with respect to the member 1 and opposite each other, the members 2 not being shown in FIG. 2, and a blackened heat exchanger 3 through which a heat-conduction medium, such as water, flows. Water is fed via feed and discharge pipe connections 4 to a water-carrying frame member 1, from the latter into the heat exchanger 3, heated in the latter by the heat given off by the irradiating sun, collected in the other water-carrying frame member 1, and then conveyed to a heat collector and/or a user. The feed and discharge pipe connections 4 can be provided at both ends of the water-carrying frame member 1.

Figure 5:
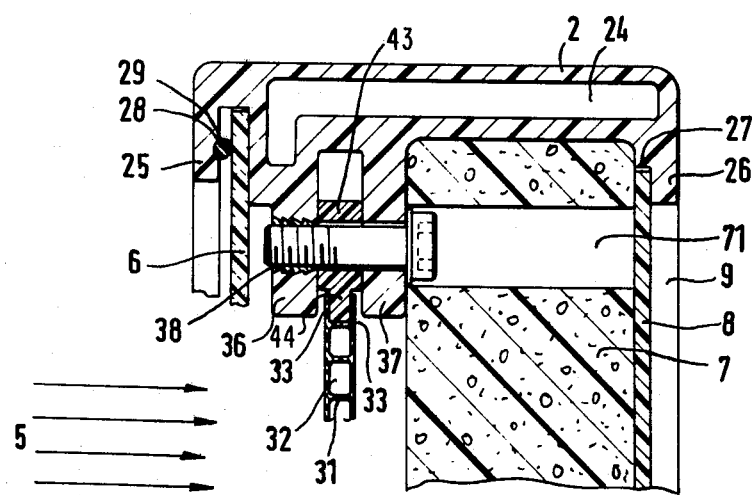
FIG. 5 is a section V—V in accordance with FIG. 1.

The solar-heat collector has—as per se usual and as shown in FIG. 5—in the direction of the solar irradiation 5, a light-transmitting covering 6 over the heat exchanger 3, a heat-insulating or heat-retaining layer 7 and a protective covering 8, behind which a free space 9 is located.

The frame members and the heat collector were hitherto made of metal, and at least the forward light-transmitting covering was made of glass; the feed and the discharge of the heat-conduction medium was accomplished via manifolds mounted on the heat exchanger, pipe connections being secured to the manifolds, and this rendered the construction per se and the assembly very complicated.

The heat-conduction medium flowing through the heat exchanger is preferably water, but it goes without saying that other fluids and gases may be used; for example, the water may be provided with an antifreeze medium.

In accordance with the invention it is advantageous for all structural elements of the solar-heat collector to be made of plastic.

In particular, the heat exchanger 3 comprises a double-walled, multi-bridged structure (FIGS. 3 and 5) where channels 32 are created which extend in the direction of the water flow and are separated from each other by members 31 that join two walls together.

Since such double-walled plates may be produced by extrusion of plastics in any desired width and/or length, the solar-heat collectors in accordance with the invention are per se not subject to any limitations of size. On the contrary, they can be adapted by simple cutting to any desired sizes.

As a practical matter, extrusion or cutting is done longitudinally, that is in the direction of flow, so that a cut, when made, is very near the connection which is to be severed, so that projecting borders 33 are formed there on the plate. Between these borders 33 is introduced a bar or lug 43 which projects laterally from the pipe connection 4 and is also made of plastic. To this projection 43 the corresponding non-water-carrying frame member 2 is secured (Compare FIG. 5).

It is thereby possible to operate the heat exchanger 3 at very greatly varying temperatures and also at very low temperatures, since it can follow heat expansions in all directions within wide ranges.

Since, in accordance with the invention, the frame members 1,2 are also made of an (extruded) plastic, they too can be cut without difficulties to any desired sizes, the width, that is the length of the water-carrying frame member 1, being subject to a very negligible limitation by the spacing between the connections 31 of the heat exchanger, since this spacing can be of the order of magnitude of millimeters.

Figure 4:
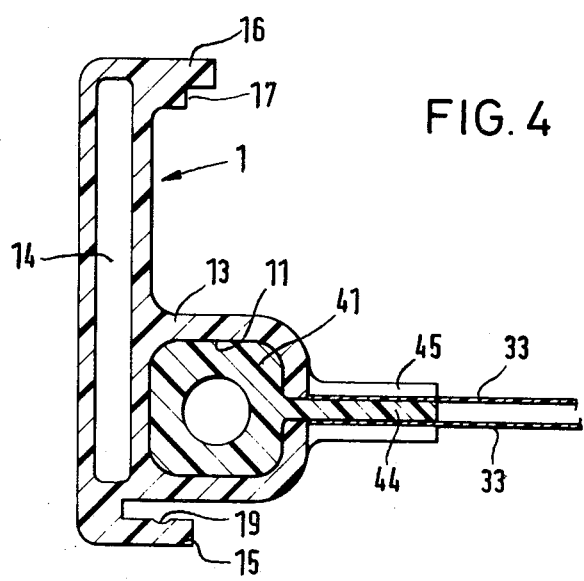
FIG. 4 is a section IV—IV in accordance with FIG. 3.

Fabrication of the water-carrying frame member 1 of plastic by means of extrusion makes it possible to impart it a shape by virtue of which it can serve as a manifold, i.e., a distributor or a collector, for the water flowing through the heat exchanger 3, as shown in FIGS. 3, 4, and 6.

The water-carrying frame member 1 has a cavity 11 which extends along the entire frame member 1. Extensions 12 of the wall 13 of the frame member 1 surrounding the cavity 11 project into the interior of the frame, that is in direction toward the heat exchanger 3, so that a clearance exists between these extensions 12 which corresponds substantially to the thickness of the heat exchanger 3, whereby a mechanical connection as well as a flow connection can be achieved between the cavity 11 and the heat exchanger 3 or its channels 32.

The end of the heat exchanger 3 can be adhesively secured between the extensions 12. Preferably, however, it is clamped between these extensions 12, the extension 12 then having inner walls 121 which open in funnel-like fashion toward the inside. The distance at the outer end 123 of the extensions 12 is less than the thickness of the heat exchanger 3 and corresponds to the distance near the inner end of the thickness of the heat exchanger 3, a stop 122 for the heat exchanger 3 being provided, if desired, whereby the outer ends 123 of the projection 12 come to lie elastically and sealingly on the end of the heat exchanger 3.

This renders the solar collector in accordance with the invention even less sensitive to heat expansion and thereby also to extreme differences in the outside temperature.

Due to the fact that the solar-heat collector, particularly its frame members 1, 2 and its heat exchanger 3, are made of plastic, there ensues the further advantage, because of the relatively poor heat conductivity of plastics, that there is no need to provide any further insulating and heat-retention measures on the outside of the frame members 1, 2.

This advantageous heat-retention effect can be still further improved by providing an insulation chamber 14 or 24 which extends over the entire length of each frame member 1, 2 and substantially over the thickness of each frame member 1, 2.

To improve the advantageous properties particularly with regard to fabrication, the feed and discharge pipe connections 4 are also made of plastic and preferably molded.

The pipe connections 4 have, as shown in FIGS. 3 and 4, lugs 41 which are pushed into the cavity 11 of the water-carrying frame member 1. At the other end, the pipe connections 4 have a conduit 41 with a junction 42, such as an outside screw thread, to which, in a manner per se known, conduits leading to the other parts of the solar collector installation can be connected. A projection 43 provided at the pipe connection 4 has a front part 44, which is inserted and adhesively secured between the projecting borders 33 of the heat exchanger 3. In the rear part 45 of the projection 43, a long slot or hole 46 is provided through which a securing member such as a screw 35 (FIG. 5) can be led, by which the non-water-carrying frame member 2 is secured at the projection 43.

If desired, the front piece 44 of the projection 43 on the pipe connection 4 may also be clamped in at least partially between the extensions 12 of the water-carrying frame member 1.

As seen particularly in FIG. 5, in which the other structural parts 6 to 8 of the solar-heat collector are also illustrated, and also as may be seen in FIG. 4, the two frame members 1, 2 further have, jointly and cooperating, a lower projection 15 and 25, respectively projecting inwardly (that is, facing the solar radiation 5), and an also inwardly projecting upper member 16 and 26, respectively, with a stage 17 and 27, respectively.

Between the lower projections 15,25 and the substantially central attachment of the heat exchanger 3 and the projection 43, a light-transmitting cover 6 is provided, preferably a transparent plastic film which is disposed spaced apart from the heat exchanger 3, and which is clamped by means of a rubber seal 28 between the lower projection 15, 25 and the central attachment, the rubber seal 28 being disposed in a groove 19 and 29, respectively, in the lower projection 15, 25.

Between the central attachment and the upper projection 16, 26, the heat-insulating layer 7 is provided and, adjacent thereto and engaging in the stage 17, 27, the protective cover 8, both of which may advantageously also be made of plastic.

These two structural elements 7, 8 can have passages, such as a passage 71 which gives access to securing members such as the screw 35, by means of which the heat exchanger 3 can be secured to the central attachment of the non-water-carrying frame member 2. For this purpose, the central attachment of the non-water-carrying frame member 2 has two forked projecting substantially parallel projections 36 and 37 with a clearance which corresponds substantially to the thickness of the bar 34 or the thickness of the projection 43 or its rear portion 45, the projections 36, 37 being provided with passages for the screw 35, and one of these passages having a thread or a threaded insert 38.

Due to the fact that advantageously one single mechanical connection is established between the frame members 1 and 2, by means of the screw 35 in the non-water-carrying member 2 through the slotted hole 46 of the projection 43 of the pipe connection 4 between the projections 36 and 37 of the non-water-carrying frame member 2, and the pipe connection 4 being secured, preferably glued-in, in the cavity 11 or between the extensions 12 of the cavity 11 of the water-carrying frame member 1, the heat exchanger which is formed by a double-connector plate has advantageously no mechanically fixed connection with the frame members 1, 2, but is guided only in the non-water-carrying frame member 2 and clamped in the water-carrying frame member 1 between the extensions 12 of the cavity 11, whereby it can follow heat expansions to a great degree.

Further, fabrication of the solar-heat collector in accordance with the invention is very simple. In particular, assembly can be done by laymen, since it is merely necessary to cut out the heat exchanger 3, the frame members 1, 2 taking into consideration the size of the miter, if desired the covers 6, 8, and the heat-damming layer 7, and to glue in the pipe connections 4. Also, the holes for the screws 35 must be bored. Thus, the solar-heat collector in accordance with the invention has a very simple and thus a very price-advantageous, that is, economical, construction, and it is also relatively light in weight.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A solar-heat collector, comprising:
   a frame made of lightweight plastic,
   a blackened heat exchanger made of lightweight plastic, through which a heat-conducting medium flows, secured in said frame, the heat exchanger comprising a double-walled, multi-bridged plastic plate with a series of parallel channels and separating walls extending from one medium-carrying member of the frame to the other,
   a feed manifold and a discharge manifold for the heat-conducting medium, both in said frame and secured to opposite ends of the heat exchanger, each manifold having two projecting walls between which the heat exchanger is clamped,
   feed and discharge pipe connections for the heat-conducting medium, respectively attached to said feed and discharge manifolds,
   a light-transmitting covering in front of the heat exchanger,
   heat insulation behind the heat exchanger,
   the frame having joining sides that extend between and join the two manifolds together,
   the heat exchanger, parallel with its channels and separating walls, being provided with a pair of projecting borders at each side, guidingly received in the joining sides of the frame by an interconnecting lug extending between and outwardly from each pair of borders, and
   fastening means securing said borders to said joining sides via said lug.

2. A solar-heat collector, comprising:
   a four-sided frame made of plastic and incorporating two opposite walls, providing integrally in one a feed manifold and in the other a discharge manifold for a heat-conducting liquid, the other two joining sides not carrying said liquid,
   a blackened heat exchanger made of plastic, secured in said frame and to said manifold for flow of the heat-conducting liquid between said manifolds through said heat exchanger,
   feed and discharge pipe connections made of plastic for the heat-conducting liquid, respectively attached to said feed and discharge manifolds,
   each pipe connection having a lug fitted into the manifold of the frame for supplying and discharging the medium into and out of the manifolds, respectively,
   a lateral projection on the pipe connection which engages and is secured to the heat exchanger in between the projecting borders of the heat exchanger, each lateral projection being secured to one of the two joining sides of the frame,
   a plastic light-transmitting covering over the front of the heat exchanger, and
   lightweight heat insulation beneath the heat exchanger.

3. A solar-heat collector, comprising:
   a rectangular plastic frame having two, opposed, liquid-conducting sides providing a feed manifold and a discharge manifold and two, opposed, non-liquid conducting sides, each said manifold having two projecting walls,
   a blackened extruded plastic heat exchanger secured in said frame and comprising a double-walled, multi-bridged plate having parallel separating walls providing a series of channels, each connected at one end to said feed manifold and at the other end to said discharge manifold for flow of liquid therebetween, said heat exchanger being clamped at each end between the projecting walls of the manifold there, said plate having its double walls projecting beyond the separating walls at each side and secured to said non-liquid conducting frame sides,
   plastic feed and discharge pipe connections attached to each said manifold, and
   a light-transmitting plastic covering the front of the heat exchanger, and
   a heat insulation beneath the heat exchanger,
   each pipe connection having a lug fitted into its manifold and a lateral projection engaging the heat exchanger in between the projecting borders of the heat exchanger.

4. A solar-heat collector in accordance with claim 3, wherein each said lateral projection is secured to a joining side of the frame.

* * * * *